J. ONOFRICHUK.
SAFETY DEVICE FOR AVIATORS.
APPLICATION FILED AUG. 6, 1917.

1,250,213.

Patented Dec. 18, 1917.
2 SHEETS—SHEET 1.

INVENTOR.
John Onofrichuk.
BY Omar Geier
HIS ATTORNEY

J. ONOFRICHUK.
SAFETY DEVICE FOR AVIATORS.
APPLICATION FILED AUG. 6, 1917.
1,250,213.
Patented Dec. 18, 1917.
2 SHEETS—SHEET 2.
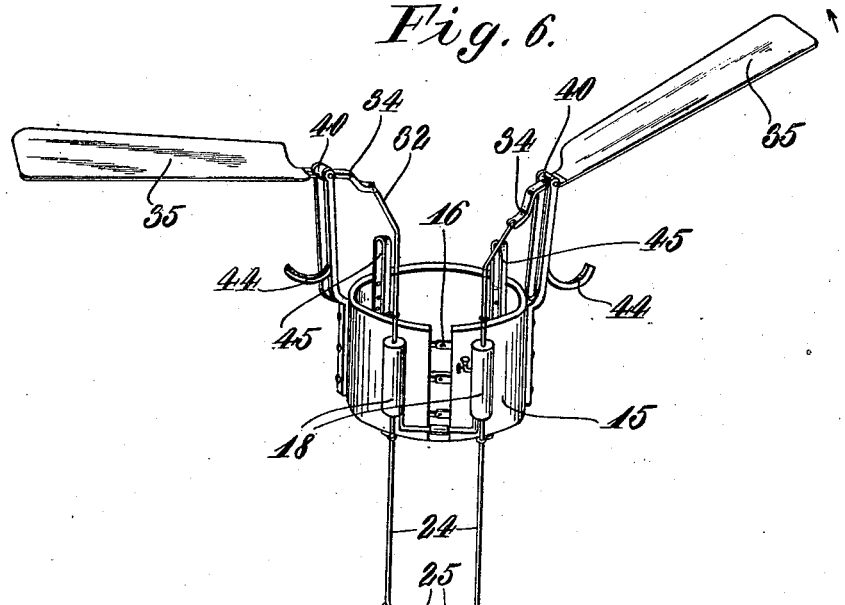
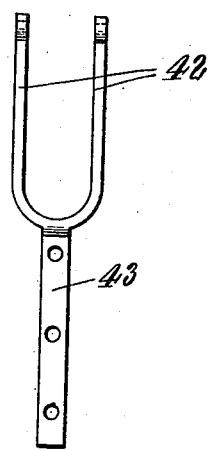
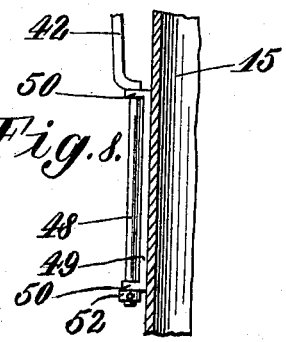
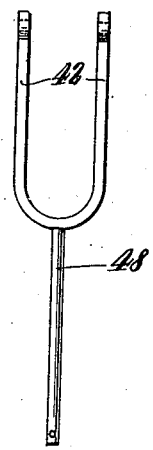
INVENTOR.
John Onofrichuk.
BY
HIS ATTORNEY

UNITED STATES PATENT OFFICE.

JOHN ONOFRICHUK, OF ATLANTA, GEORGIA.

SAFETY DEVICE FOR AVIATORS.

1,250,213.  Specification of Letters Patent.  Patented Dec. 18, 1917.

Application filed August 6, 1917. Serial No. 184,741.

*To all whom it may concern:*

Be it known that I, JOHN ONOFRICHUK, a citizen of Russia, resident of Atlanta, county of Fulton, and State of Georgia, have invented certain new and useful Improvements in Safety Devices for Aviators, of which the following is a specification.

This invention relates to improvements in safety devices for aviators, and has as its principal object the provision of means whereby the fall of an aviator from a flying machine or the like may be materially retarded, so that he is able to reach the ground without serious injury.

A further object is to provide such devices in forms which may be readily attached and operated without discomfort should they be required.

These and other like objects are attained by the novel construction and combination of parts hereafter described and shown in the accompanying drawings, forming a material part of this disclosure, and in which—

Fig. 6 is a perspective view of the apparatus in an operable condition.

Fig. 7 is a front plan view of one of the wing supports.

Fig. 8 is a fragmental side elevational view showing a modified form of support, and Fig. 9 is a front elevational view of the same.

Figure 1:
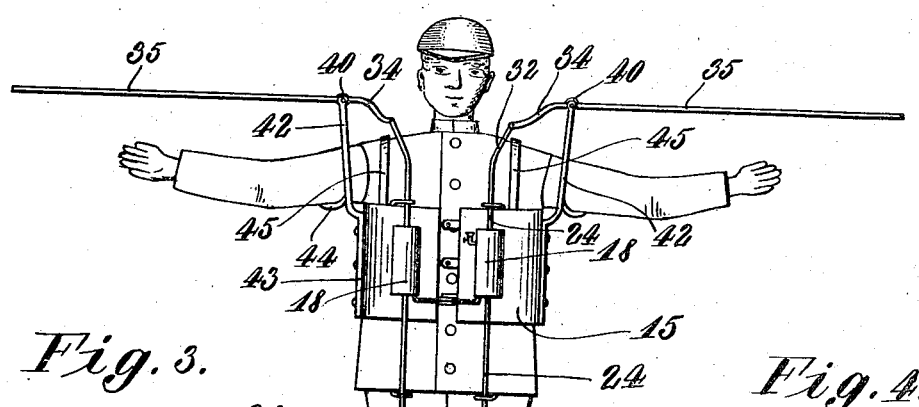
Figure 1 is a front elevational view indicating the application of the invention.
Figure 3:
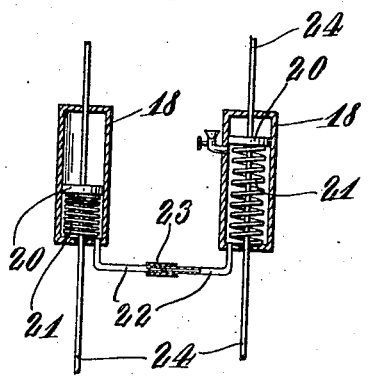
Fig. 3 is a vertical sectional view taken through the air compressing or compensating cylinders.
Figure 4:
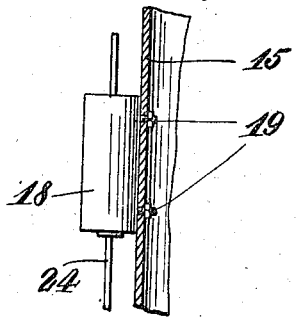
Fig. 4 is a side elevational view of the same, showing the manner of their attachment to a support.
Figure 2:
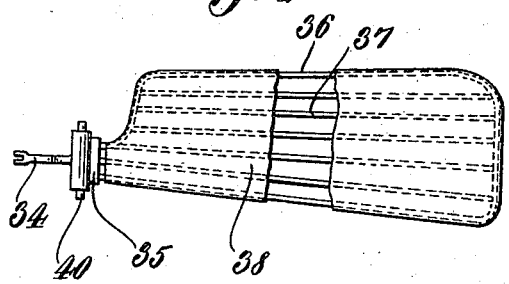
Fig. 2 is a fragmental enlarged top plan view of a wing used in the apparatus.
Figure 5:
Fig. 5 is a fragmental sectional view illustrating the manner of attaching the supports by which the wings are carried.

In the drawings, the numeral 15 is applied to a belt or band adapted to nearly encircle the body of the wearer, the ends being secured together by appropriate fastenings 16, arranged directly at the front so as to hold the band tightly engaged with the waist of the wearer.

Secured to the adjacent ends, at the front of the band, are a pair of cylinders 18, the same being held vertically by rivets or bolts 19, the cylinders having tight heads at both ends and containing pistons 20, held normally upward by means of the coiled springs 21, and are connected together by bent tubes 22, engaged by a slidable coupling 23 at the center, in such manner that the two parts may be quickly united or disjointed as occasion may require.

Secured centrally of the pistons 20 are rods 24, in which, at their lower ends, are pivotally engaged loops 25, having plates 30 at their bottoms on which the feet of the wearer may be pressed.

The upper ends of the rods 24 pass through the heads of the cylinders 18, after which they are bent outwardly and rearwardly, the extreme ends 32 being pivotally engaged with the forked ends 34 of winglike elements 35 the same consisting of a light frame 36, between the end elements of which extend support rods or braces 37, the whole being covered with a fabric 38 so as to present a considerable impervious area to the air.

These wings are provided with pivots 40, set in forks, 42 and connected by stems 43, secured upon opposite sides of the band 15, so as to be firmly supported by the same and carry extending rests 44 adapted to receive the arms of the wearer, straps 45 being attached to the band 15, adapted to pass over the shoulders and by means of which the device is held in position in addition to the securing means 16.

In the alternative form shown in Figs. 8 and 9, the forks 42 are formed with a round stem 48, carried in brackets 49, having extending lugs 50, in which the stems 48 may rotate, the latter being held in operative position by the collars 52 attached to the ends of the stems below the lowermost lugs.

In operation, the band having been properly adjusted to the body of the wearer, and the feet placed in position upon the plates 30, the lower limbs are moved in the manner of walking, first one foot being raised and then the other, thereby causing alternate compression of the springs 21 and movement of the pistons 20, which is further assisted by the air compressed below the pistons within the cylinders 18, which, by reason of their connections 24 actuate the wings 25 in an obvious manner.

Having thus described my invention what I claim as new, and desire to secure by Letters Patent, is—

1. In a flying device, the combination with a band and means for securing said band to an operator, of a pair of wings pivotally engaged with said band, a pair of pedals, connections between said pedals and said wings whereby they may be actuated, a pair of cylinders secured to said band, springs within said cylinders, pistons secured to the connections between said wings and said pedals, said pistons being operable in said cylinders, and an air connection between said cylinders, whereby said pistons are caused to act alternately.

2. In a safety suit for aviators, the combination with a rigid band adapted to be secured to the body of an operator, of supports extending upward from said band, oppositely disposed wings pivotally engaged in said supports, arm rests engaged with said supports, a pair of cylinders secured vertically on said band, pistons operable in said cylinders, means for normally pressing said pistons upwardly within said cylinders, a pair of pedals, rods connecting between said pedals and said wings whereby they may be operated, said rods being engaged with said pistons and passing through said cylinders, and air communicating means between said cylinders whereby said pistons are caused to operate in alternate relation.

In testimony whereof I have affixed my signature.

JOHN ONOFRICHUK.

Copies of this patent may be obtained for five cents each, by addressing the "Commissioner of Patents, Washington, D. C."